(12) United States Patent
Iwasaki (10) Patent No.: US 12,511,340 B2
(45) Date of Patent: Dec. 30, 2025

(54) INFORMATION PROCESSING APPARATUS, METHOD OF CONTROLLING INFORMATION PROCESSING APPARATUS, AND STORAGE MEDIUM

(71) Applicant: Canon Kabushiki Kaisha, Tokyo (JP)

(72) Inventor: Shingo Iwasaki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 282 days.

(21) Appl. No.: 18/326,148

(22) Filed: May 31, 2023

(65) Prior Publication Data

US 2024/0020349 A1    Jan. 18, 2024

(30) Foreign Application Priority Data

Jul. 15, 2022 (JP) ................. 2022-114318

(51) Int. Cl.
*G06F 16/957* (2019.01)
*G06F 3/04842* (2022.01)

(52) U.S. Cl.
CPC ...... *G06F 16/9577* (2019.01); *G06F 3/04842* (2013.01)

(58) Field of Classification Search
CPC .............. G06F 16/9577; G06F 3/04842
See application file for complete search history.

(56) References Cited

U.S. PATENT DOCUMENTS

| | | | | | |
|---|---|---|---|---|---|
| 6,011,537 | A * | 1/2000 | Slotznick | ................. | G09G 5/00 715/714 |
| 7,702,607 | B2 * | 4/2010 | Torge | ........................ | G06N 5/04 706/45 |
| 7,721,303 | B2 * | 5/2010 | Alves de Moura | ....... | G06F 8/38 709/202 |
| 7,980,462 | B1 * | 7/2011 | Graef | ................... | G06Q 20/382 235/487 |
| 2002/0073263 | A1 * | 6/2002 | Barrenscheen | ......... | G06F 13/24 710/260 |
| 2002/0165925 | A1 * | 11/2002 | Hamilton, II | ....... | G06F 16/9574 709/224 |
| 2002/0169670 | A1 * | 11/2002 | Barsade | ............. | G06Q 30/0277 705/14.47 |
| 2003/0177075 | A1 * | 9/2003 | Burke | ................ | G06Q 30/0601 705/26.1 |
| 2003/0187995 | A1 * | 10/2003 | Fok | ......................... | H04L 67/02 709/227 |

(Continued)

FOREIGN PATENT DOCUMENTS

| | | |
|---|---|---|
| JP | H11242643 A | 9/1999 |
| JP | 2011138256 A | 7/2011 |
| JP | 2012038073 A | 2/2012 |

OTHER PUBLICATIONS

Japanese Office Action issued May 10, 2024 in counterpart Japanese Patent Appln. No. 2022-114318.

*Primary Examiner* — Tadesse Hailu
(74) *Attorney, Agent, or Firm* — Venable LLP (57) ABSTRACT

An information processing apparatus comprising: a detection unit configured to detect a press by a user on a predetermined region of Web content; a rendering unit configured to execute rendering in response to the press; and a notification unit configured to notify the user when the detection unit detects that the predetermined region is pressed again while the rendering unit is executing the rendering.

12 Claims, 10 Drawing Sheets

(56) References Cited

U.S. PATENT DOCUMENTS

| | | | | |
|---|---|---|---|---|
| 2004/0137875 | A1* | 7/2004 | Ueno | H04M 3/5191 455/408 |
| 2005/0172000 | A1* | 8/2005 | Nakamura | H04N 1/00204 709/224 |
| 2005/0198567 | A1* | 9/2005 | Vermeulen | G06F 40/18 709/219 |
| 2006/0031785 | A1* | 2/2006 | Raciborski | H04L 67/06 715/859 |
| 2013/0139091 | A1* | 5/2013 | Raciborski | H04L 65/80 709/217 |
| 2013/0210398 | A1* | 8/2013 | Roussel | H04L 67/60 455/414.2 |
| 2014/0172568 | A1* | 6/2014 | Cunningham | G06Q 30/0257 705/14.55 |
| 2015/0116755 | A1* | 4/2015 | Hayakawa | G06K 15/408 358/1.14 |
| 2016/0092414 | A1* | 3/2016 | Kalyanasundaram | G06F 8/33 715/234 |

* cited by examiner

```
<html>
 <body>
  <div class="slide-area">SLIDE DISPLAY UNIT</div>                                 ~411
  <button class="carousel-back" type="button">PREVIOUS</button>                    ~412
  <button class="carousel-next" type="button">NEXT</button>                        ~413
  </script>                                                                        ~414
    $('.carousel-back').click(function(){
       PROCESSING OF SLIDE DISPLAY UNIT WHEN PREVIOUS BUTTON IS PRESSED             ~415
    }
    $('.carousel-next').click(function(){
       PROCESS OF SLIDE DISPLAY UNIT WHEN NEXT BUTTON IS PRESSED                    ~416
    }
  </script>
 </body>
</html>
```

```
<html>
 <body>
  <style>
  .hamburger{
    cursor:pointer;
  }
  </style>

<div class="hamburger">
      DISPLAY BUTTON OF MENU
  </div>

<script>
   $('.hamburger').click(function(){
      PROCESSING OF MENU WHEN BUTTON IS PRESSED
   }
  </script>

</body>
</html>
```

INFORMATION PROCESSING APPARATUS, METHOD OF CONTROLLING INFORMATION PROCESSING APPARATUS, AND STORAGE MEDIUM

BACKGROUND OF THE INVENTION

Field of the Invention

The present invention relates to an information processing apparatus, a method of controlling the information processing apparatus, and a storage medium.

Description of the Related Art

In recent years, various devices have installed therein a Web browser function for displaying Web content. Web content is generally an HTML document described in an HTML language or a JavaScript (trademark) language, and a Web browser can display texts and images described in the Web content. In addition, it is also possible to present an animation of a situation corresponding to an operation on the Web content.

However, in a case of a low-performance device that takes a long time for the rendering process, a start of the animation in response to an operation may be slow when a user operated on the Web content. In such a case, the user may misunderstand that the operation has failed and may perform same operation twice.

Patent document 1 discloses that pressing twice on the Web browser is prevented when screen transition to a different screen is performed by an operation on the Web content displayed on the Web browser. Specifically, pressing twice is prevented by covering the entire screen with a transparent frame to disable operations on the screen when transitioning to a different screen due to an operation.

CITATION LIST

Patent Document 1: Japanese Patent Laid-Open No. 2011-138256

However, in the technique described in Patent Document 1, any operation on the entire screen is disabled, and thus a user who has performed an operation on the Web content may be confused as to whether or not the operation has been successful when it takes a long time until screen transition is performed.

SUMMARY OF THE INVENTION

The present invention has been made to solve the aforementioned problem, and provides a technique that reduces the possibility that a user who has performed an operation on Web content may be confused whether or not the operation has been successful, and improves the convenience for the operation by the user.

According to one aspect of the present invention, there is provided an information processing apparatus comprising: a detection unit configured to detect a press by a user on a predetermined region of Web content; a rendering unit configured to execute rendering in response to the press; and a notification unit configured to notify the user when the detection unit detects that the predetermined region is pressed again while the rendering unit is executing the rendering.

Further features of the present invention will become apparent from the following description of exemplary embodiments (with reference to the attached drawings).

DESCRIPTION OF THE EMBODIMENTS

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

In the present embodiment, an example will be described, in which a user is notified of information indicating about a case where a predetermined region on a screen is pressed by the user and a rendering process executed by the press is under execution, but the predetermined region is pressed again by the user.

<Hardware Configuration>

Figure 1:
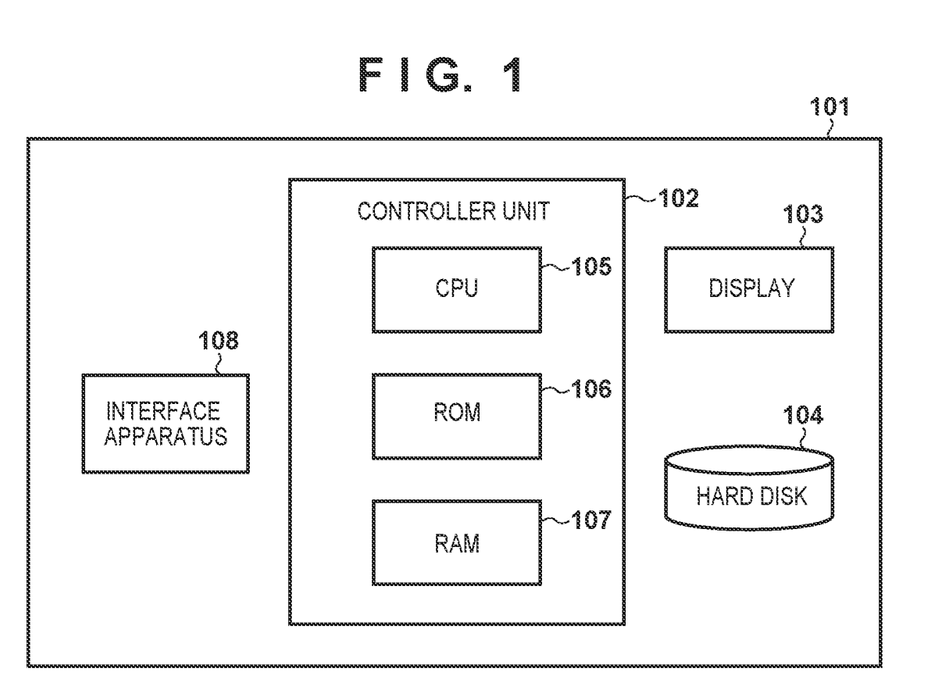
FIG. 1 is a block diagram illustrating a hardware configuration of an information processing apparatus according to an embodiment.

FIG. 1 is a block diagram illustrating an example of a hardware configuration of an information processing apparatus according to the present embodiment. An information processing apparatus 101 includes a controller unit 102 configured to control the entire apparatus, a display 103, a hard disk 104, and an interface apparatus 108.

The controller unit 102 includes a CPU 105, a ROM 106, and a RAM 107. The CPU 105 executes a process of each processing unit in the information processing apparatus 101. The ROM 106 stores various programs executed by the CPU 105, data required by the programs, and the like. In addition, a part of the programs and data may be preliminarily stored in the hard disk 104 that is an external storage apparatus, and read out to the RAM 107 for execution. A program according to the present embodiment, which controls display of Web content and a process when a predetermined region is operated, is stored in the ROM 106 or the hard disk 104, and is read out by the CPU 105, thus the process is executed.

The RAM 107, which is a work region for each processing unit in the information processing apparatus 101, temporarily stores data used during program execution. The display 103 displays a Web browser that displays Web content. The interface apparatus 108 is an interface configured to connect the information processing apparatus 101 to a network or the like, or an interface configured to connect a keyboard and a mouse to the information processing apparatus 101 and receive signals from the keyboard and the mouse. The information processing apparatus 101 connects to another information processing apparatus over the network and performs data transmission and receiving, via the interface apparatus 108. In addition, the information processing apparatus 101 receives information about operations on the connected keyboard and mouse and notifies the controller unit 102 of the information.

<Functional Configuration>

Figure 2:
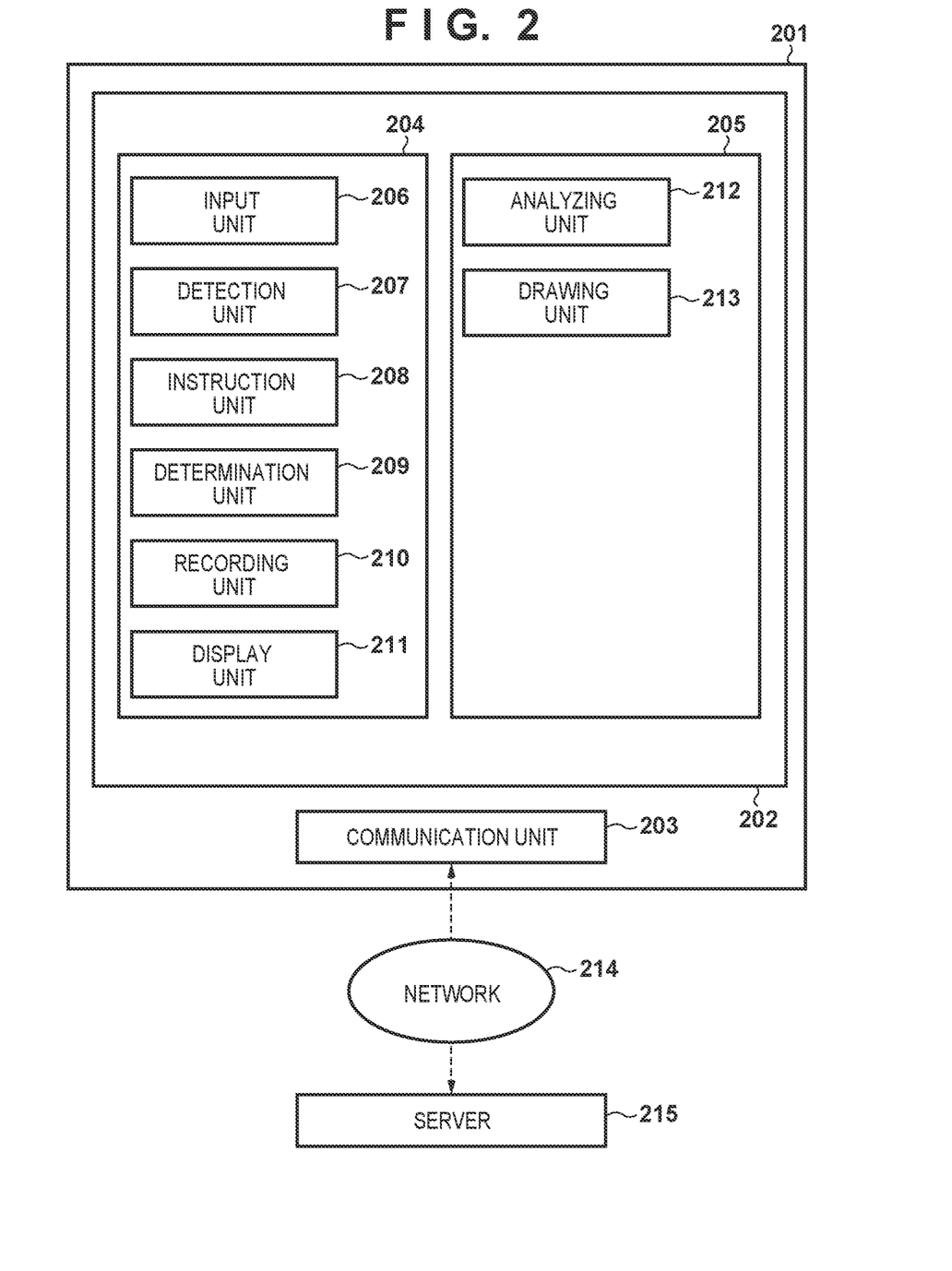
FIG. 2 is a functional block diagram of an information processing apparatus according to an embodiment.

Next, FIG. 2 is a block diagram illustrating an example of a functional configuration of information processing apparatus 101 according to the present embodiment. In the present embodiment, the following explanation is provided assuming that the information processing apparatus 101 is a device 201 having a Web browser function installed therein.

The device 201 includes a control unit 202 and a communication unit 203. The control unit 202 functions as a Web browser. The control unit 202 includes a browser application 204 and a browser engine 205.

The browser application 204 accepts an operation on the Web content from the user and displays a drawing result in response to the operation. The browser application 204, which is controlled in accordance with a program stored in the ROM 106, includes an input unit 206, a detection unit 207, an instruction unit 208, a determination unit 209, a recording unit 210, and a display unit 211. The Browser engine 205 analyzes the HTML, JavaScript, CSS or the like in the Web content and generates a drawing result. The browser engine 205, which is controlled in accordance with a program stored in the ROM 106, includes an analyzing unit 212 and a rendering unit 213.

In addition, the device 201 can connect from the communication unit 203 to a server 215 via a network 214.

Next, each processing unit of the device 201 will be described. The input unit 206 included in the browser application 204 input Web content acquired by the communication unit 203 by accessing the server 215 via the network 214. The detection unit 207 detects a touch operation by a user on the display 103 displaying the Web content being input. The instruction unit 208 instructs the browser engine 205 to perform an acquisition process of the information of the Web content at touch coordinates indicating the touched position, or to perform a rendering process of the Web content.

The determination unit 209 determines whether or not the touched position is included in a region for operating the Web content being displayed, whether or not rendering update of the Web content is ongoing, whether or not the operation is already ongoing, or the like. The recording unit 210 records and manages identification information for determining whether or not a rendering update is ongoing, and the touch coordinates indicating the touched position.

The display unit 211 displays a rendering result of the operation for the Web content. In addition, when the determination unit 209 has determined that the operation is already ongoing, the display unit 211 displays information indicating that the Web content is being operated.

The analyzing unit 212 included in the browser engine 205 analyzes the HTML, CSS, and JavaScript of the input Web content at the touch coordinates. The rendering unit 213 performs a rendering update process based on the result of analyzing the HTML, CSS, and JavaScript of the input Web content corresponding to the touch coordinates.

Processing

Figure 3A:
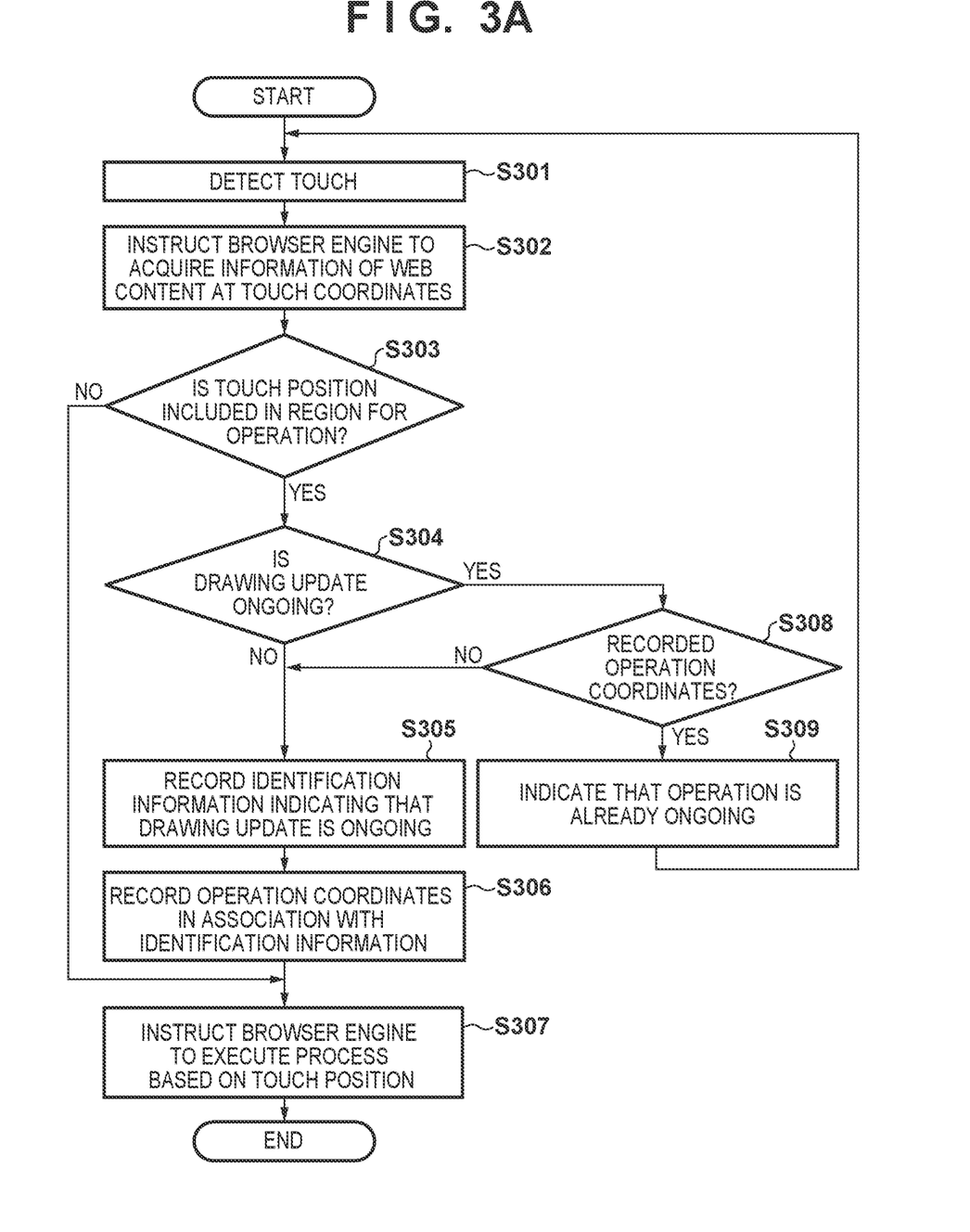
FIGS. 3A and 3B are flowcharts illustrating a process flow according to a first embodiment.
Figure 3B:
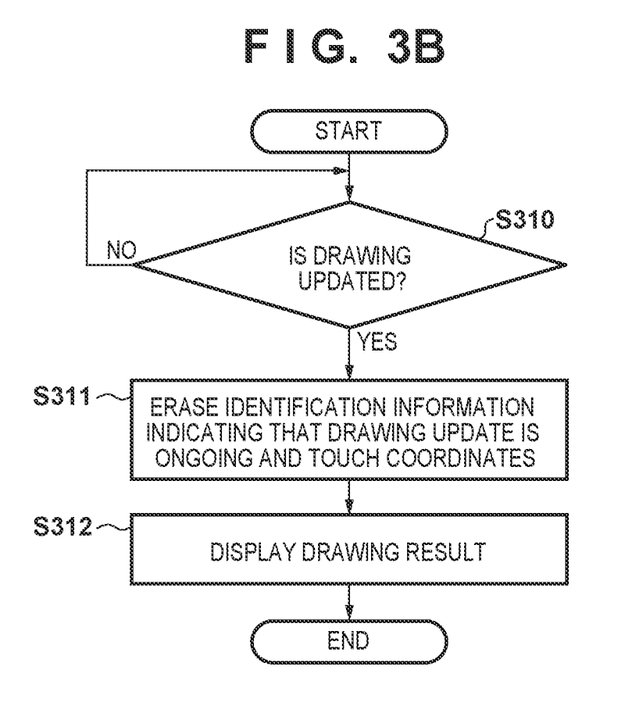

Subsequently, referring to the flowcharts in FIGS. 3A and 3B, the flow of the entire process performed by the control unit 202 of the device 201, which is the information processing apparatus according to the present embodiment, will be described. Here, when the browser application 204 is activated, two threads start in parallel in a program and operate asynchronously. FIG. 3A illustrates the process flow of a thread 1 and FIG. 3B illustrates the process flow of a thread 2.

First, a process in the thread 1 will be described, referring to FIG. 3A.

At step S301, the detection unit 207 of the browser application 204 detects a touch operation by the user.

At step S302, the instruction unit 208 of the browser application 204 instructs the browser engine 205 to acquire information of the Web content at the touch coordinates indicating the touched position. The analyzing unit 212 of the browser engine 205 that has received the instruction analyzes the information of the Web content at the touch coordinates indicating the touched position, and returns the analysis result to the browser application 204.

At step S303, the determination unit 209 of the browser application 204 determines, from the information of the acquired Web content at the touch coordinates, whether or not the touched position is included in the region for operating the Web content. When a touch position is included in the region for operation (YES at step S303), the process flow proceeds to step S304. When, on the other hand, the touch position is not included in the region for operation (NO at step S303), the process flow proceeds to step S307.

At step S304, the determination unit 209 of the browser application 204 determines whether or not a rendering update is ongoing, based on identification information for identifying whether or not a rendering update is ongoing. When a rendering update is ongoing (YES at step S304), the process flow proceeds to step S308. When, on the other hand, a rendering update is not ongoing (NO at step S304), the process flow proceeds to step S305.

At step S305, the recording unit 210 of the browser application 204 records identification information indicating that a rendering update is ongoing. At step S306, the recording unit 210 of the browser application 204 records the touch coordinates (operation coordinates) indicating the position touched for operation of the Web content in association with the identification information indicating that a rendering update is ongoing.

At step S307, the instruction unit 208 of the browser application 204 instructs the browser engine 205 to execute a process based on the touch position. The rendering unit 213 of the browser engine 205 that has received the instruction executes the process based on the touch position.

For example, when the result of analyzing the information of the Web content at the touched position indicates a process of starting an animation by a touch operation, a rendering update is required and thus a rendering update process is performed. On the other hand, when a position where nothing occurs by a touch operation is touched, the rendering unit 213 of the browser engine 205 executes nothing in response to such instruction.

At step S308, the determination unit 209 of the browser application 204 determines whether or not the touch coordinates indicating the touched position have already been recorded. When the touch coordinates have already been recorded (YES at step S308), the process flow proceeds to step S309. When, on the other hand, the touch coordinates are not recorded (NO at step S308), the process flow proceeds to step S305.

At step S309, the display unit 211 of the browser application 204 displays information indicating that the operation that is executed by touch is already ongoing. Subsequently the process flow returns to S301. The series of processes illustrated in FIG. 3A thus ends.

Next, processes in the thread 2 will be described, referring to FIG. 3B. At step S310, the determination unit 209 of the browser application 204 asynchronously waits for a notification of completion of the rendering update sent from the browser engine 205, and determines whether or not the rendering is updated. When the rendering is updated (YES at step S310), the process flow proceeds to step S311. When the rendering is not updated (NO at step S310), the process flow waits at step S310.

At step S311, the recording unit 210 of the browser application 204 erases the recorded identification information indicating that a rendering update is ongoing and the touch coordinates (operation coordinates). At step S312, the display unit 211 of the browser application 204 displays the rendering result of the Web content, rendering of which is updated. The series of processes illustrated in FIG. 3B are thus ends.

Application Example

Next, specific examples of the processes illustrated in FIGS. 3A and 3B will be described, referring to FIGS. 4A to 4C, FIG. 5, and FIG. 6.

Figure 4A:
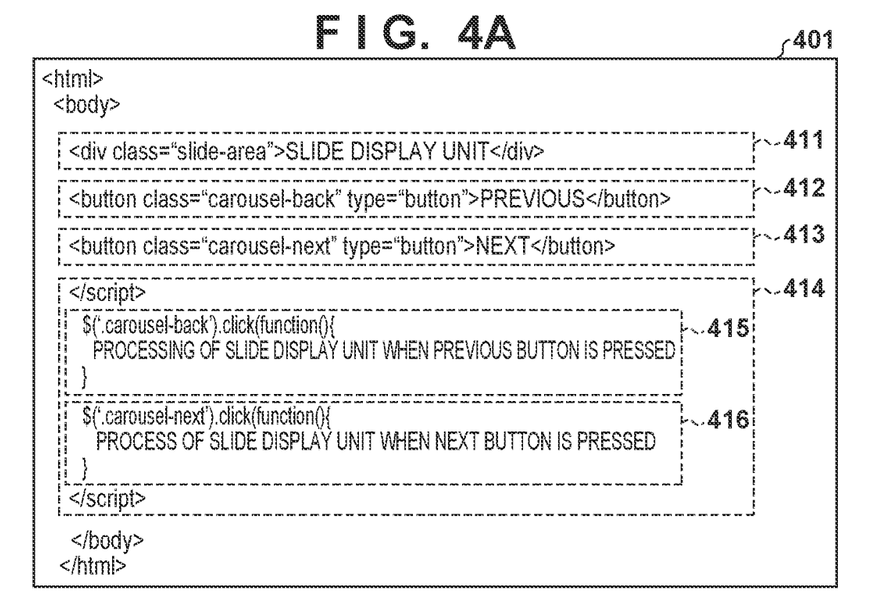
FIG. 4A is a diagram illustrating a description example of Web content according to the first embodiment.
Figure 4B:
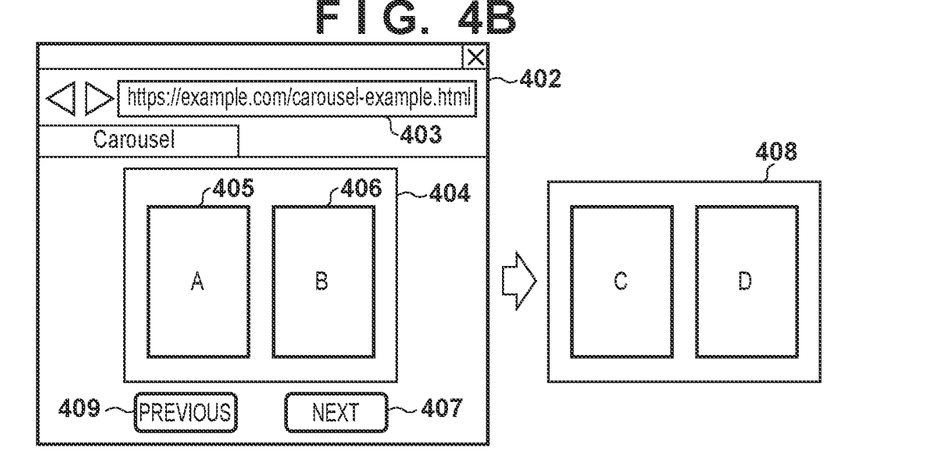
FIG. 4B is a diagram illustrating a display example of the Web content according to the first embodiment.

As illustrated in FIG. 4A, Web content 401 is described in an HTML document (carousel-example.html). As illustrated in FIG. 4B, a situation where contents of the Web content 401 is displayed on a Web browser 402 with a URL indicating the Web content 401 being input in a URL input bar 403 is illustrated. In the following, specific screen transition will be described.

When the Web content 401 is loaded, rectangles A and B are respectively displayed in a region 405 and a region 406 of a slide display unit 404. Pressing a "Next" button 407 starts an animation and rectangles C and D are displayed in a sliding manner as illustrated in a frame 408. Pressing a "Previous" button 409 in that state starts an animation and the rectangles A and B are displayed again. In other words, this is Web content in which two rectangles are displayed in a horizontally sliding manner by button control. Preliminarily retaining rectangle data for display as a single horizontally long picture as indicated by a reference numeral 410 in FIG. 4C allows for displaying with shifting display positions by the button control without performing network communication. In other words, pressing the "Next" button 407 once displays the rectangles C and D in a sliding manner, and pressing the "Next" button 407 once more displays rectangles E and F in a sliding manner.

Next, detailed configuration of the Web content 401 illustrated in FIG. 4A will be described. A reference numeral 411 indicates the slide display unit 404. A reference numeral 412 indicates the "Previous" button 409 and a reference numeral 413 indicates the "Next" button 407. A region indicated by a reference numeral 414 is described in JavaScript, and at a reference numeral 415, a control is described indicating which rectangle is to be displayed on the slide display unit 404 when the "Previous" button 409 is pressed. Similarly, at a reference numeral 416, a control is described indicating which rectangle is to be displayed on the slide display unit 404 when the "Next" button 407 is pressed. Here, the Web content 401 is an example, and description contents are only excerpts of the part necessary for explaining the present embodiment.

At step S302 illustrated in FIG. 3A, for example, when the "Next" button 407 in FIG. 4B is pressed, information about a <button> component indicated by the reference numeral 413 in the Web content 401 can be acquired. This <button> component indicates a part for operation on the Web content, and thus it can be determined to be a component for operation on the Web content at step S303. Although the <button> component is illustrated as an example of a button in the present embodiment, the button is not limited thereto and may be an <input type="button"> component, for example.

Figure 5:
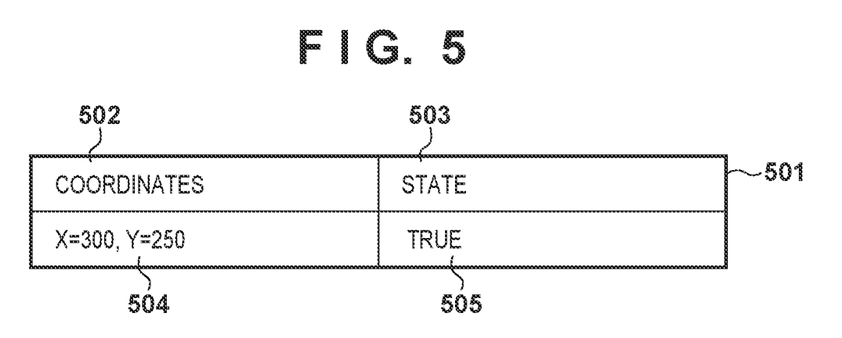
FIG. 5 is a diagram illustrating an example of a specific data structure according to the first embodiment.

FIG. 5 is an explanatory diagram for the processes at steps S305, S306, S311 and S312 illustrated in FIGS. 3A and 3B. Table information 501 manages coordinates 502 that is operated (touched) by the user and a status 503 indicating whether or not a rendering update is ongoing. Coordinates 504 indicate coordinates indicated by X=300 and Y=250, for example, as the coordinates actually operated by the user. Since the rendering update is ongoing until the "Next" button 407 is pressed and the rendering process by the press is completed, a status 505 is recorded with a value TRUE as identification information. When the rendering process by pressing the "Next" button 407 is completed, the coordinates 504 and the identification information of the status 505 ("TRUE" in this case) are deleted. Here, the table information is an example and may be any form of information without being limited to the aforementioned table information, provided that the coordinates operated this time have already been operated before and the information allow identification for whether or not the rendering update by the operation is ongoing.

Figure 6:
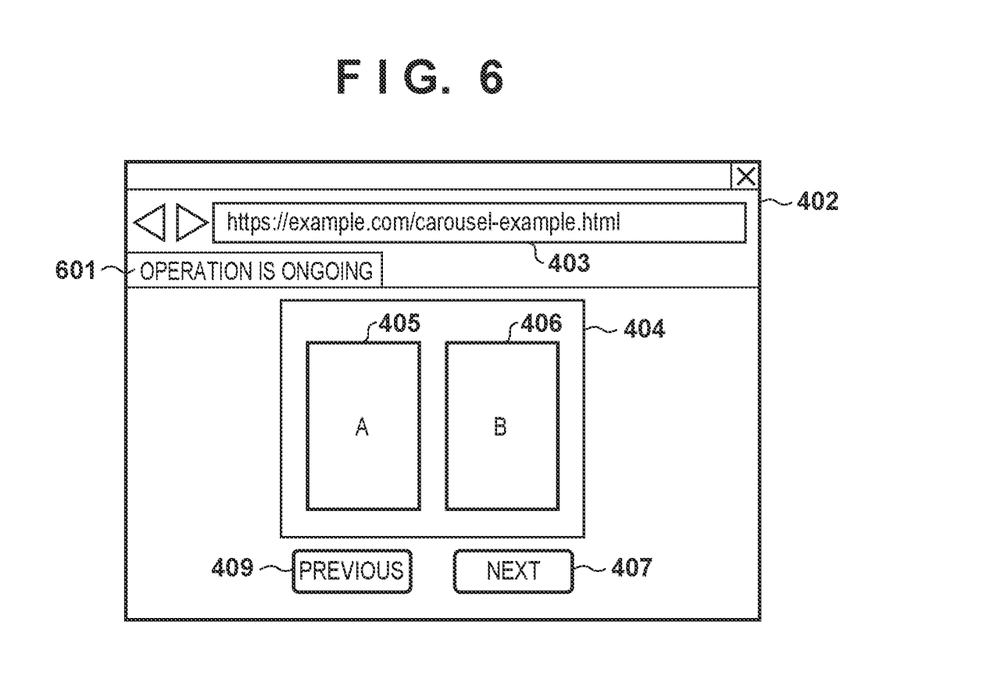
FIG. 6 is a diagram illustrating a display example of the Web content according to the first embodiment.

FIG. 6 is an explanatory diagram of the process at step S309 illustrated in FIG. 3A. Here, FIG. 6 indicates an example of the Web browser 402 as illustrated in FIG. 4B, and description of identical reference numerals being omitted. When the process at step S309 is executed, the browser application 204 displays a text string "operation ongoing" on a tab 601 of the Web browser 402 as status information, in order to notify the user that an operation is ongoing.

Accordingly, for example, in a case where the user has pressed the "Next" button 407 in a state of the rectangles A and B being displayed on the slide display unit 404 and the start of the animation of switching to the rectangles C and D is slow, "operation ongoing" will be displayed on the tab 601 when the user presses the "Next" button 407 again. The user's confusion can thus be reduced and convenience of operation on the Web content is improved. Here, the display position is not limited to a header position such as the tab 601, and it may also be displayed at a footer position.

Figure 7A:
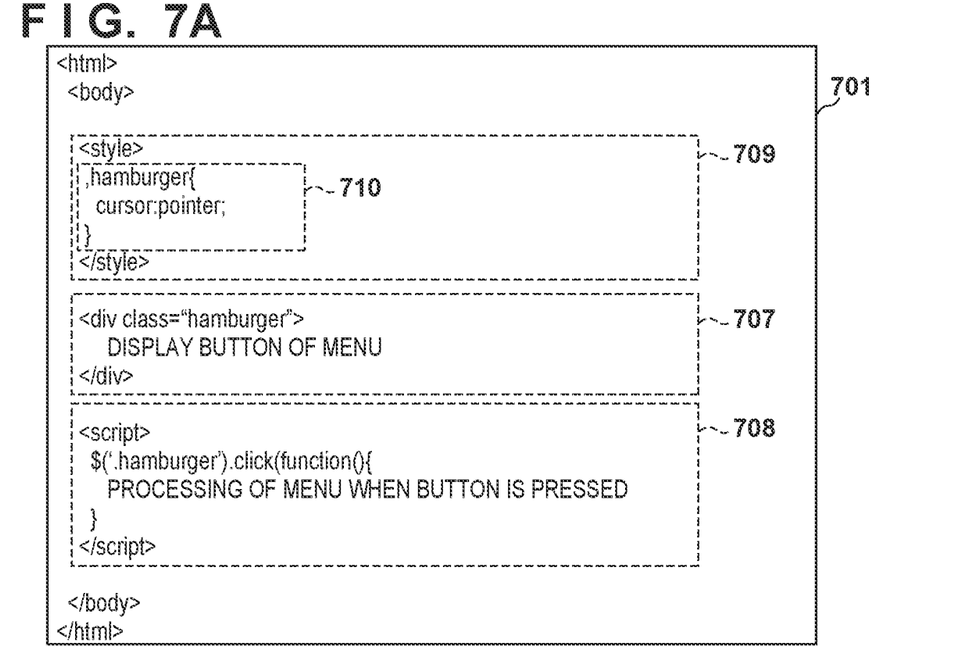
FIG. 7A is a diagram illustrating a description example of the Web content according to the first embodiment.
Figure 7B:
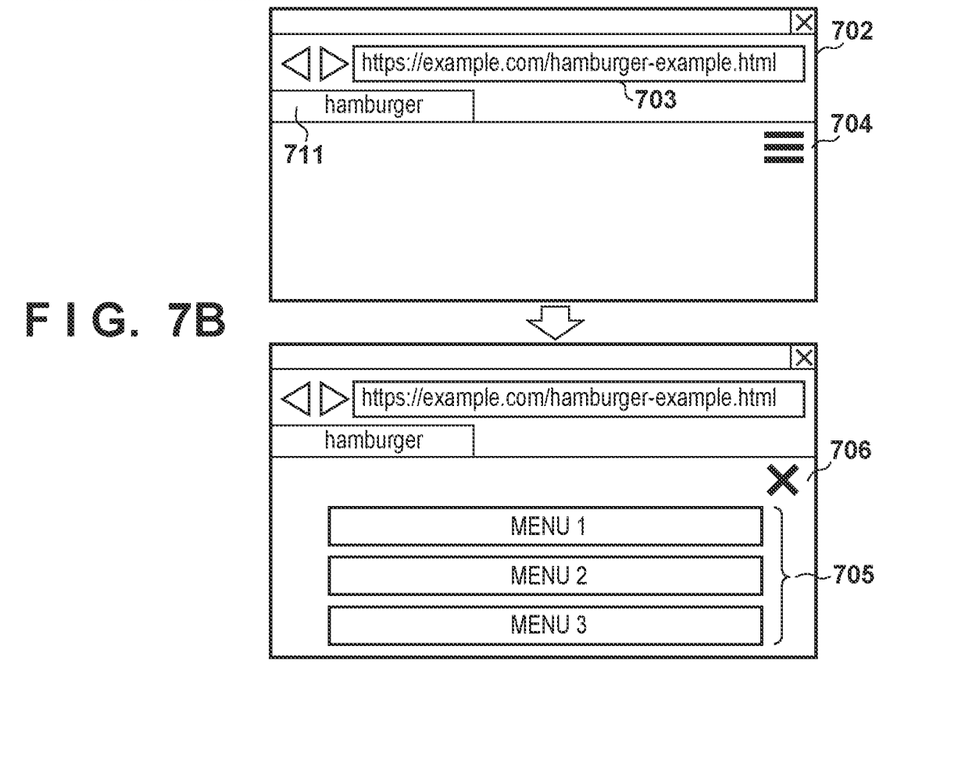
FIG. 7B is a diagram illustrating a display example of the Web content according to the first embodiment.

Furthermore, other specific examples of the present embodiment will be described, referring to FIGS. 7A and 7B. As illustrated in FIG. 7A, Web content 701 is described in an HTML document (hamburger-example.html). A Web browser 702 illustrated in FIG. 7B illustrates a situation where a URL indicating the Web content 701 is input in a URL input bar 703 and then contents of the Web content 701 is displayed. In the following, specific screen transition will be described.

When the Web content 701 is loaded, a button 704 as illustrated in FIG. 7B is displayed. When the user presses a button 704, menus 1 to 3 are displayed with an animation as indicated by a reference numeral 705, and the button 704 changes to an x button 706. When the user presses the x button 706, display of menus 1 to 3 indicated by the reference numeral 705 disappear and the button 704 is displayed again. In this way. switching of menu display by pressing a button is expressed by an animation in the Web content 701.

Next, detailed configuration of the Web content 701 illustrated in FIG. 7A will be described. A region 707 is a component for displaying a button 704. A region 708 is described by the JavaScript and includes a description of control content for the menu display process when the button 704 is pressed. A region 709 is described in Cascading Style Sheets (CSS) and specifies the style property 710 (cursor:pointer) for a component in the region 707. Generally, the cursor:pointer is used in a Web browser as a signal indicating that an operation can be performed with the picture of the cursor changing to a picture of a pointing hand, when the mouse cursor is placed on a component in the region 707. In other words, information of these components and CSS can be acquired at step S302 of FIG. 3A, and it can be determined at step S303 that an operation is performed at the position.

Here, the Web content 701 is an example, and description contents are only excerpts of the part necessary for explaining the present embodiment.

The user's confusion can be reduced by displaying "operation ongoing" on the tab 711, for example, when the user presses the button 704 again in a case where the user has pressed the button 704 and the start of the animation of displaying the menus 1 to 3 on 705 is slow.

As has been described above, in the present embodiment, in a case where the predetermined region on the screen has been pressed by the user and the rendering process executed by the press is executing, the user is notified of information indicating that the process is ongoing when a predetermined region is pressed again by the user.

In this way, the possibility of confusion by a user who has operated on the Web browser and cannot recognize whether or not the operation has been actually successful can be reduced. Therefore, convenience in user operation is improved.

Furthermore, in the present embodiment, other operations performed by the user can be accepted during the rendering update, for example, cancellation of a process can be accepted while the process is ongoing, which improves user convenience.

Although an example has been described in the first embodiment in which the operated coordinates are preliminarily recorded and then determination is made whether or not the coordinates operated at the second time match the recorded coordinates, the present invention is not limited thereto. For example, a process may be added in which not only the operated coordinates but also information of the HTML and CSS related to the operated coordinates are managed, and when the operated coordinates are different when operation is performed again, determination is made whether or not information of the operated HTML and CSS match. Alternatively, a process may be added in which determination is made whether or not the coordinates are within a region including the information of the operated HTML and CSS. In other words, there is a possibility that the press will not be determined as a second operation although the user intended to press the same position, because coordinates operated the second time may be different from the coordinates operated at first time, in a case where the coordinates are exactly determined. Such a possibility can be reduced.

Second Embodiment

In the present embodiment, an example will be described in which the user is inquired whether or not to continue the operation at the timing of displaying the text "operation ongoing" in the first embodiment. Note that, in the present embodiment, description of parts overlapping with the processes in the first embodiment will be omitted.

<Processing>

Next, referring to the flowchart illustrated in FIG. 8, the entire flow of process conducted by the control unit 202 of the device 201, which is the information processing apparatus according to the present embodiment, will be described. Here, when the browser application 204 is activated, two threads start in parallel in a program and operate asynchronously. The process flow of thread 1 is illustrated in FIG. 8, whereas the process flow of thread 2 is similar to that described in FIG. 3B and therefore description will be omitted.

Figure 8:
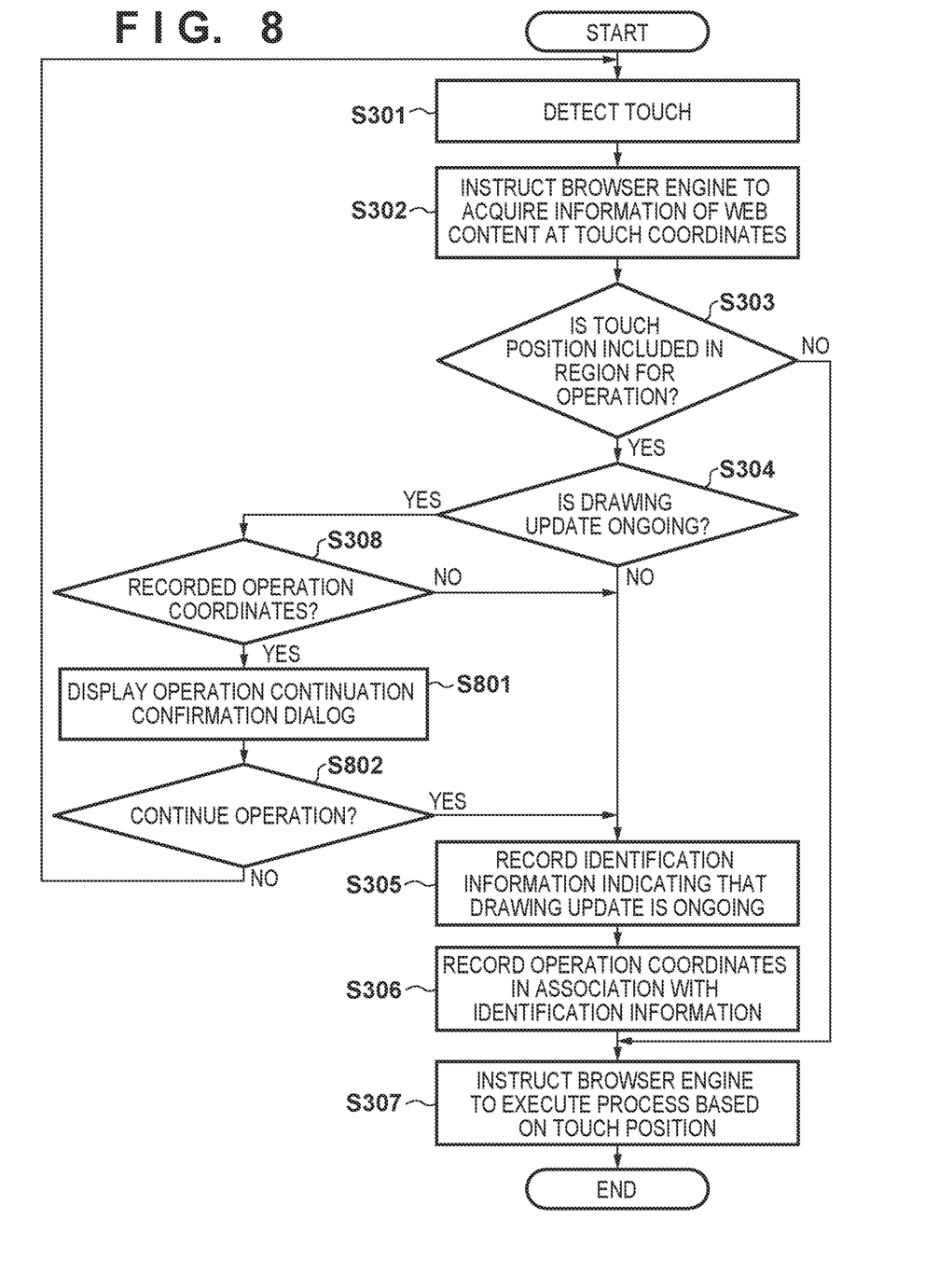
FIG. 8 is a flowchart illustrating a process flow according to an embodiment.

Also in FIG. 8, description about overlapping parts in the processes of FIG. 3A will be omitted. In the flowchart of FIG. 8, steps S801 and S802 are performed in place of step S309 of FIG. 3A.

At step S801, the display unit 211 displays an operation continuation confirmation dialog inquiring the user to select whether or not to enable the operation performed by the user immediately before. At step S802, the determination unit 209 determines whether or not to allow the operation to continue, based on the user's response to the operation continuation confirmation dialog. When the operation is continued (YES at step S802), the process flow proceeds to step S305. When, on the other hand, the operation is not continued (NO at step S802), the process flow returns to step S301.

Application Example

Figure 4C:
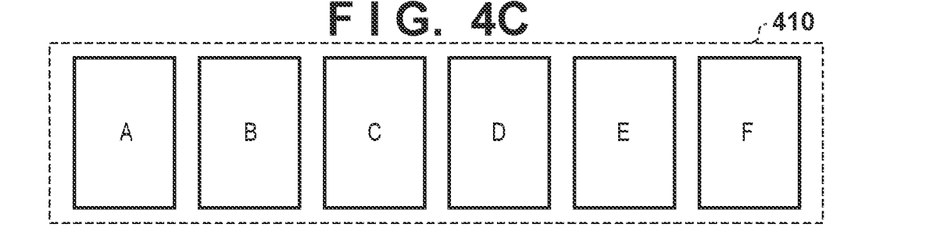
FIG. 4C is a diagram illustrating an example of rectangle data for display according to the first embodiment.
Figure 9:
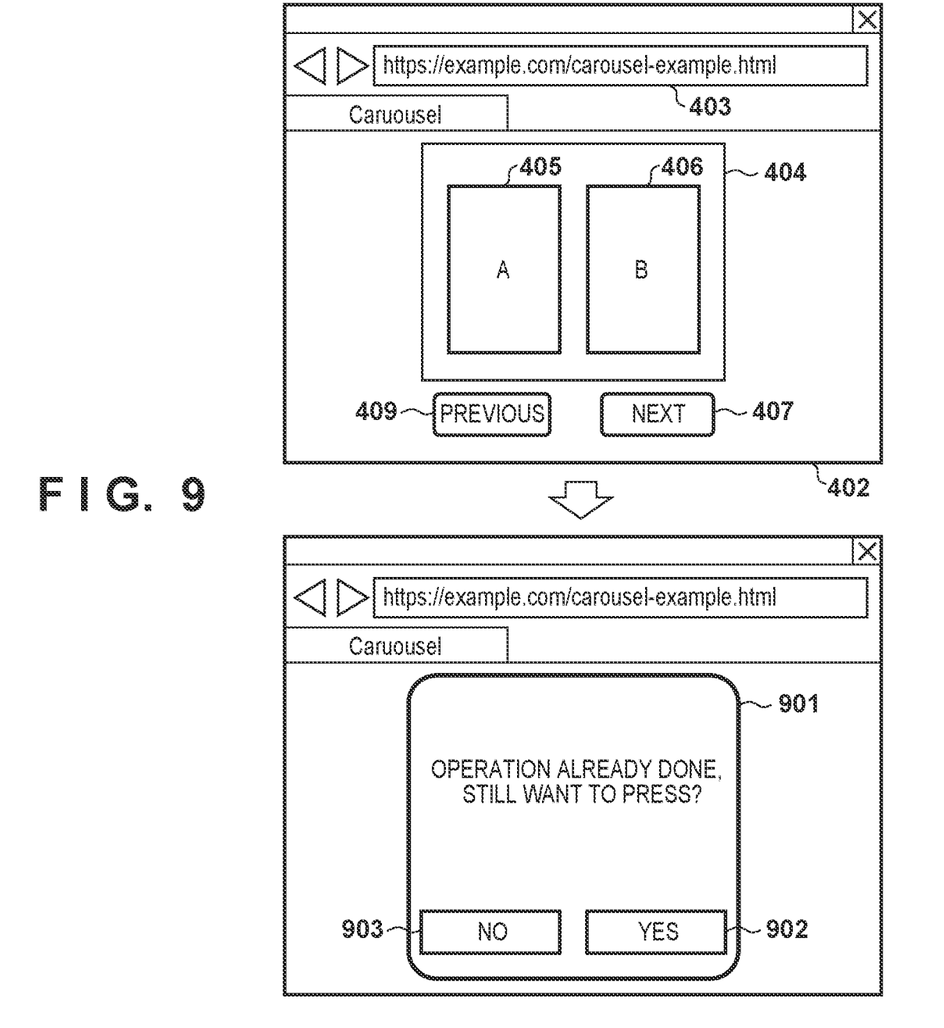
FIG. 9 is a diagram illustrating a display example of Web content according to a second embodiment.

Next, referring to FIG. 9, an example of specific processes at steps S801 and S802 illustrated in FIG. 8 will be described. In FIG. 9, configurations similar to those in FIGS. 4A to 4C are provided with same reference numerals, and description about overlapping parts in processes will be omitted.

In a situation where the user has pressed the "Next" button 407 but the start of animation is taking a long time and the user presses the "Next" button 407 again, as the process at step S801, an operation continuation confirmation dialog 901 including a selection button is displayed. The operation continuation confirmation dialog 901 includes a message "Operation already done, still want to press?".

When the user understands that the operation will be done a second time and still wants to continue the operation, the user presses the YES button 902 for selection. When the user realizes by the dialog display that the operation has already been done and determines that it is not necessary to continue the operation, the user presses the NO button 903 for selection. Pressing of the YES button 902 is interpreted by the Web browser that the "Next" button 407 is pressed twice, and thus the rectangles C and D on the slide display unit 404 are displayed and subsequently the rectangles E and F are further displayed in a slide-in manner.

As has been described above, according to the present embodiment, a second-time operation can be enabled, and thus convenience of operation by the user is improved.

Third Embodiment

In the present embodiment, an example will be described in which the display position of the operation continuation confirmation dialog described in the second embodiment is controlled. Note that, in the present embodiment, description about overlapping parts in processes of the first and the second embodiments will be omitted.

Application Example

Figure 10:
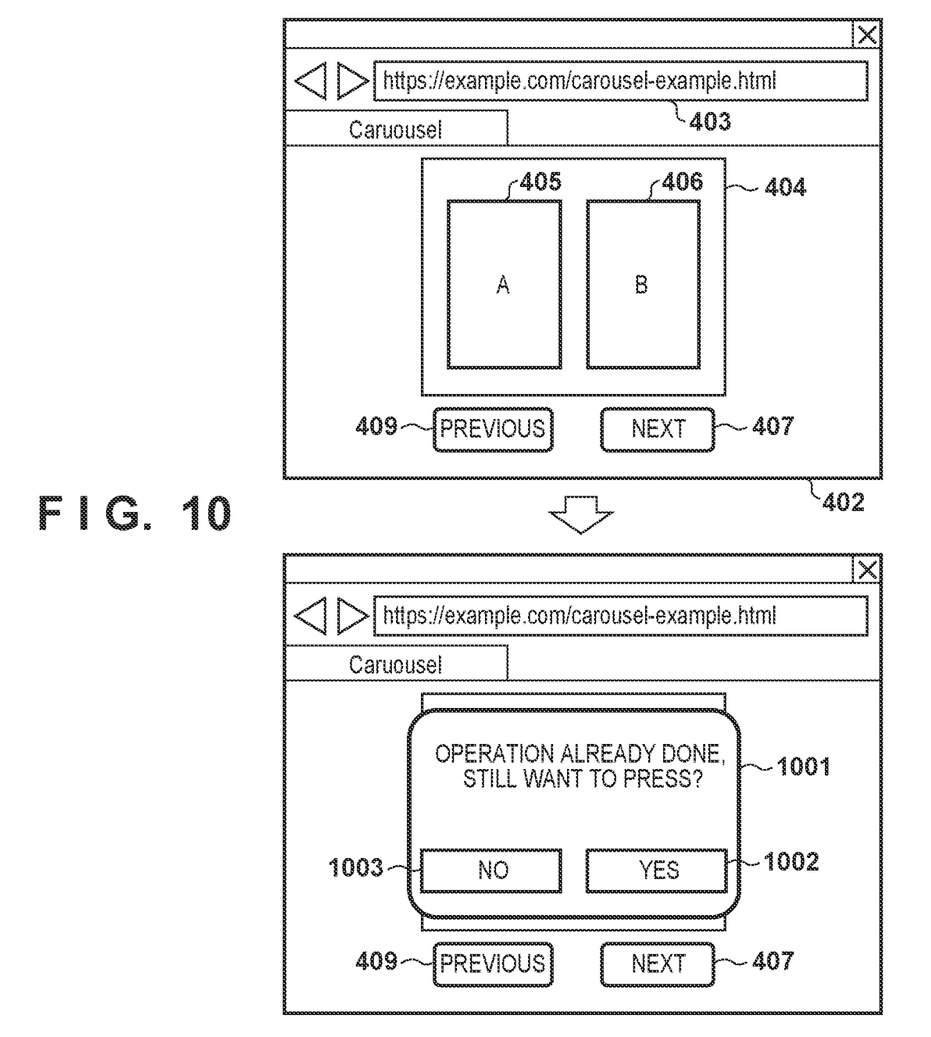
FIG. 10 is a diagram illustrating a display example of Web content according to a third embodiment.

FIG. 10 illustrates an example of a specific data structure according to an embodiment of the present invention. In FIG. 10, in a situation where the user has pressed the "Next" button 407 but the start of animation is taking a long time and the user presses the "Next" button 407 again, as the process at step S801, an operation continuation confirmation dialog 1001 is displayed. The operation continuation confirmation dialog 1001 includes a message "Operation already done, still want to press?". At this time, a YES button 1002 and a NO button 1003 of the operation continuation confirmation dialog 1001 are displayed not overlapping with the "Next" button 407. In other words, control is performed such that the YES button 1002 and the NO button 1003 are not displayed at the coordinates where the operation that has caused displaying of the operation continuation confirmation dialog 1001.

As has been described above, according to the present embodiment, an operation not intended by the user, i.e., an operation in which the user intends to press the NO button 1003 but unintentionally presses the YES button 1002 when attempting to press the "Next" button 407 again, can be prevented. As a result, user convenience is improved.

Variation Example

Although examples of detecting a touch operation by the user as a press have been described in the aforementioned embodiments, the present invention is not limited thereto. For example, a click operation at a cursor position with a mouse operation may be detected as a press.

The present invention allows for reducing the possibility of confusing a user as to whether or not an operation performed on Web content by the user has been successfully performed, and improving user operation convenience.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-114318, filed Jul. 15, 2022, which is hereby incorporated by reference herein in its entirety.

What is claimed is:

1. An information processing apparatus comprising:
    a detection unit configured to detect a press by a user on a first region of Web content;
    a rendering unit configured to execute rendering in response to the press;
    a notification unit configured to notify the user when the detection unit detects that the first region is pressed again while the rendering unit is executing the rendering; and
    a control unit configured to control such that the rendering unit executes rendering in response to a press on a second region of Web content that is different from the first region when the detection unit detects that the second region is pressed while the rendering unit is executing the rendering in response to the press on the first region.

2. The information processing apparatus according to claim 1, wherein the notification unit notifies information indicating that an operation is ongoing.

3. The information processing apparatus according to claim 1, wherein the notification unit displays an operation continuation confirmation dialog prompting the user to select whether or not to execute a process corresponding to the press on the first region and displays buttons for selection that accept a selection of whether or not to execute a process corresponding to the press on the first region, when the detection unit detects that the first region is pressed again while the rendering unit is executing the rendering in response to the press on the first region,
    wherein the operation continuation confirmation dialog includes a message "Operation already done, still want to press?".

4. The information processing apparatus according to claim 3, wherein the notification unit displays the button for selection not overlapping with the first region.

5. The information processing apparatus according to claim 1, wherein the Web content is an HTML document described in HTML or CSS.

6. The information processing apparatus according to claim 1, wherein the first region is a region for accepting a first operation on the Web content, and
wherein the second region is a region for accepting a second operation on the Web content.

7. The information processing apparatus according to claim 1, wherein the first region includes information about a button of HTML.

8. The information processing apparatus according to claim 1, wherein the first region includes information about cursor: pointer that is one of CSS properties.

9. The information processing apparatus according to claim 1, further comprising:
a storing unit configured to store coordinates of a position of the first region pressed by the user,
wherein the detection unit detects that the first region is pressed again based on the first region being pressed in a state where the storing unit stores the coordinates of the position of the first region.

10. The information processing apparatus according to claim 9, wherein the storing unit deletes the stored coordinates of the position of the first region when the rendering by the rendering unit in response to the press on the first region is completed.

11. A method of controlling an information processing apparatus, comprising:
detecting a press by a user on a first region of Web content;
executing rendering in response to the press;
notifying the user when it is detected that the first region is pressed again while the rendering is being executed; and
controlling to execute rendering in response to a press on a second region of Web content that is different from the first region when it is detected that the second region is pressed while the rendering in response to the press on the first region is being executed.

12. A non-transitory computer-readable storage medium storing a program for causing a computer to execute a method of controlling an information processing apparatus, the method of controlling the information processing apparatus comprising:
detecting a press by a user on a first region of Web content;
executing rendering in response to the press;
notifying the user when it is detected that the first region is pressed again while the rendering is being executed; and
controlling to execute rendering in response to a press on a second region of Web content that is different from the first region when it is detected that the second region is pressed while the rendering in response to the press on the first region is being executed.

* * * * *